(12) United States Patent
Smith

(10) Patent No.: US 6,394,431 B1
(45) Date of Patent: May 28, 2002

(54) HIGH FORCE FEEL BUMPER WITH LOW FINAL LOAD

(75) Inventor: David P. Smith, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/813,539

(22) Filed: Mar. 21, 2001

(51) Int. Cl.[7] .............................. G05G 5/06; G05G 1/04
(52) U.S. Cl. .................... 267/136; 74/471 XY; 74/523; 267/139
(58) Field of Search ............................... 60/487, 547.1; 267/136, 139; 91/376 R, 369.2, 485, 433, 358 R, 522; 137/625.65, 636.1, 636.2, 556, 596.1; 200/5 A, 517, 342; 74/471 XY, 527, 531, 471 R; 188/378; 251/285, 279

(56) References Cited

U.S. PATENT DOCUMENTS

| | | | |
|---|---|---|---|
| 3,586,392 A | * | 6/1971 | Ballard et al. |
| 3,738,543 A | | 6/1973 | Aperlo |
| 4,256,144 A | * | 3/1981 | Barbagli ................. 74/471 XY |
| 4,355,660 A | | 10/1982 | Huffman |
| 4,434,876 A | | 3/1984 | McKechnie |
| 4,503,301 A | | 3/1985 | Kurtz |
| 4,962,916 A | | 10/1990 | Palinkas |
| 5,104,101 A | | 4/1992 | Anderson et al. |
| 5,107,963 A | | 4/1992 | Rocca et al. |
| 5,443,294 A | * | 8/1995 | Prinz et al. |
| 5,546,847 A | | 8/1996 | Rector et al. |
| 5,558,127 A | * | 9/1996 | Maruyama et al. |
| 5,809,841 A | * | 9/1998 | Smith ........................... 74/523 |
| 5,875,682 A | * | 3/1999 | Smith .................... 74/471 XY |
| 6,098,481 A | * | 8/2000 | Mills et al. ............. 74/471 XY |
| 6,128,971 A | * | 10/2000 | Papasideris ............... 74/471 R |
| 6,328,127 B1 | * | 12/2001 | Hori et al. ............. 74/471 XY |

* cited by examiner

*Primary Examiner*—Douglas C. Butler
(74) *Attorney, Agent, or Firm*—Haverstock, Garrett & Roberts

(57) ABSTRACT

The feel bumper includes a plunger disposed for movement by an input device along a predetermined path, and at least one damper element disposed to engage the plunger when in a predetermined initial position along the path corresponding to a desired operating position for exerting a first opposing feedback force against the plunger in opposition to movement thereof along the path in a first direction, the at least one damper element being yieldable to the plunger when moved in the first direction past the predetermined initial position and exerting a second opposing feedback force against the plunger in opposition to the continued movement of the plunger in the first direction through subsequent operating positions.

22 Claims, 9 Drawing Sheets

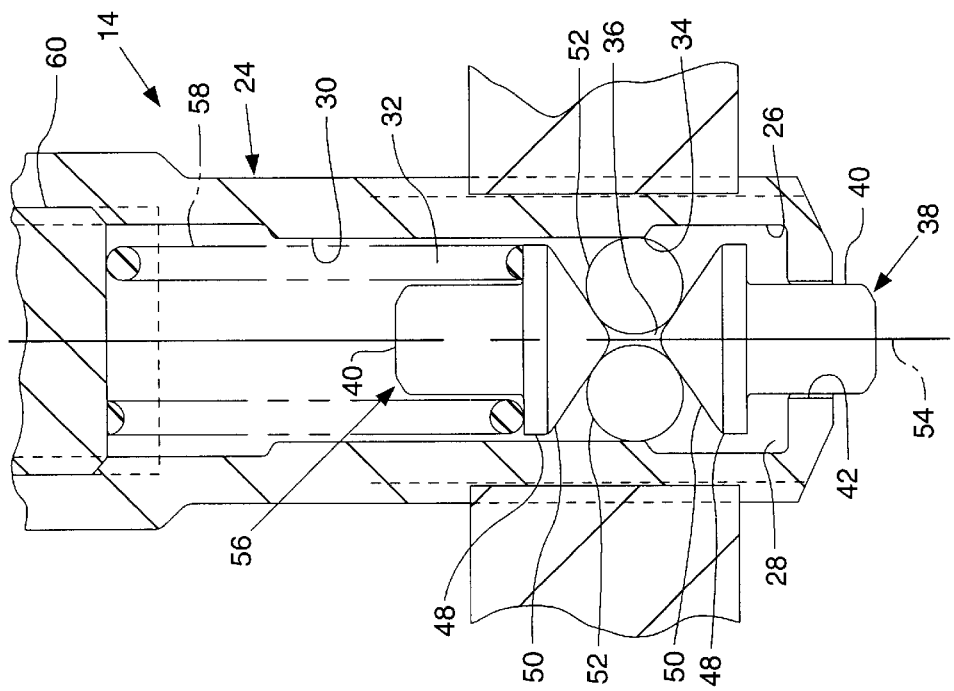
Fig-2a-
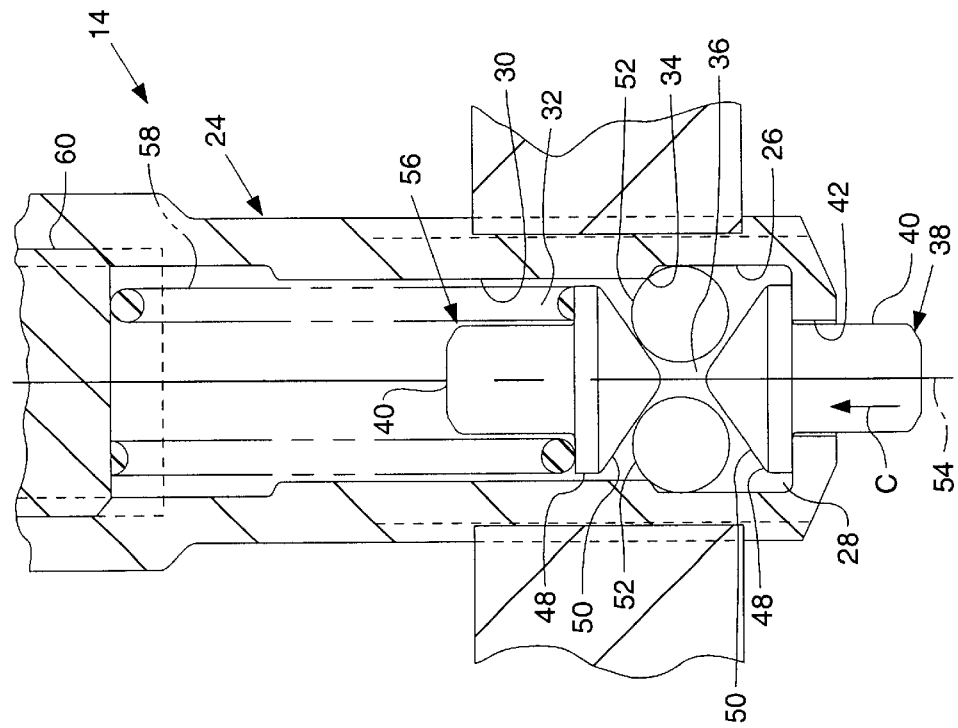
Fig-2b-

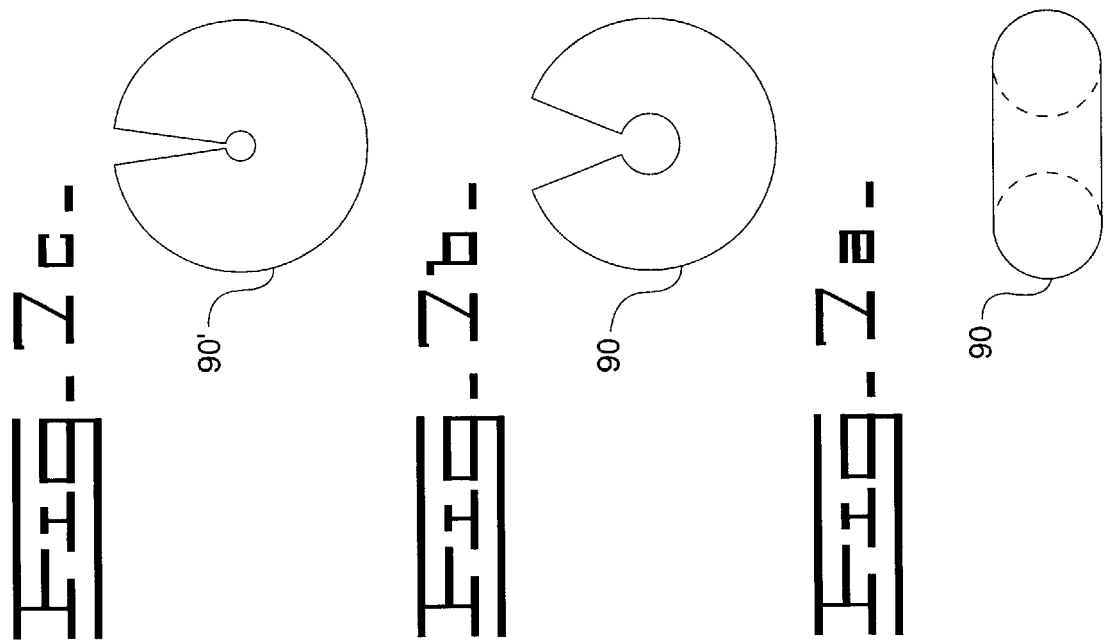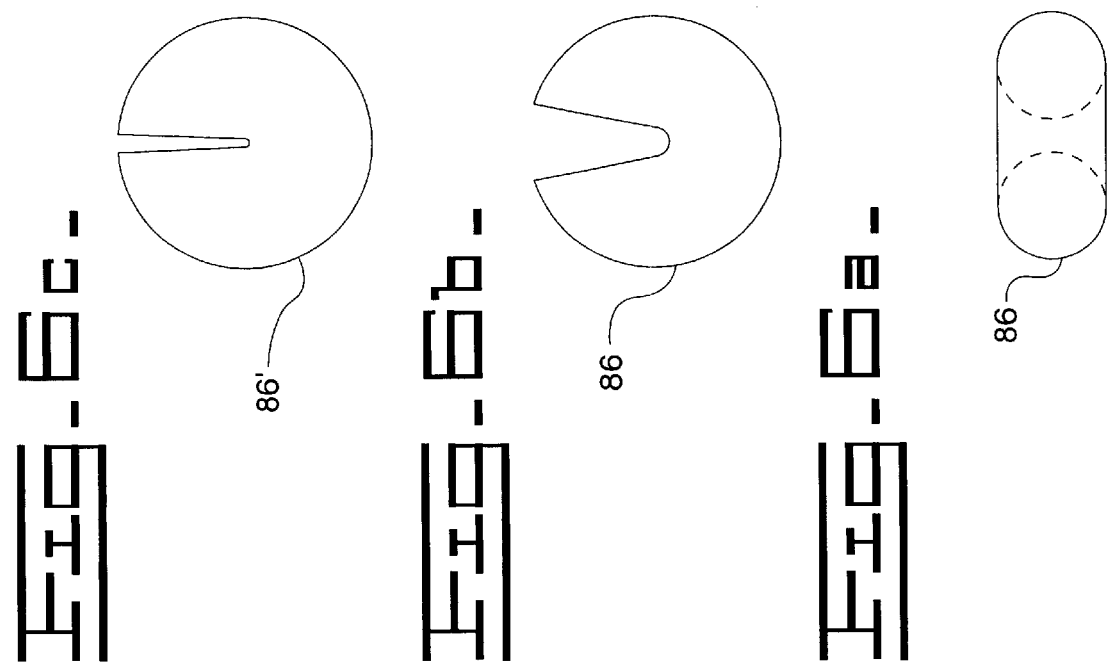

HIGH FORCE FEEL BUMPER WITH LOW FINAL LOAD

TECHNICAL FIELD

This invention relates generally to a feel bumper for providing feedback to an operator when an input device is moved to a predetermined initial operating position and then past the initial position through a range of subsequent positions, and more particularly, to a feel bumper which provides a distinctive high feedback force or load when the input device is moved to the initial operating position and lower feedback forces when moved through the range of subsequent positions.

BACKGROUND ART

Input devices, such as, but not limited to, lever operated single and dual axis pilot control valves, are often provided with some type of associated feedback device, such as a feel bumper or the like, for signaling to the operator when the input device is moved to an initial predetermined position for performing certain operating functions, such as, but not limited to, commonly known "quick drop", "float" or "float down" functions in the instance of input devices of work machines such as those with a blade or bucket. Some known input devices also use a magnetic detent including an electromagnet to hold the pilot valve spring and pressure generated centering loads as well as loads generated by the feel bumper and G-load forces.

One problem associated with some of the known feel bumpers is that they utilize a low initial feedback force, or preload, so as to be only marginally effective in keeping the input device from inadvertently being moved to or past the predetermined initial position. In other known devices, the feel bumpers are set with an acceptable preload, but then the magnetic detent hold force is low. In still other known devices, the magnetic detent hold force is higher, but this is disadvantageous as it requires a coil which must be larger for generating the magnetic force and requires higher amperage.

Accordingly, the present invention is directed to overcoming one or more of the problems as set forth above.

DISCLOSURE OF THE INVENTION

According to one aspect of the present invention, a feel bumper is disclosed including a plunger disposed for movement by an input device along a predetermined path, and at least one damper element disposed to engage the plunger when in a predetermined initial position along the path corresponding to a desired operating position for exerting a first opposing feedback force against the plunger in opposition to movement thereof along the path in a first direction, the at least one damper element being yieldable to the plunger when moved in the first direction past the predetermined initial position and exerting a second opposing feedback force against the plunger in opposition to the continued movement of the plunger in the first direction, the second opposing feedback force being less than the first opposing feedback force.

According to a preferred aspect of the invention, the damper element includes at least one ball disposed to be urged by the plunger against a shoulder located along the path of movement when the plunger is at the predetermined initial position for generating the first opposing feedback force, the at least one ball being displaceable past the shoulder by movement of the plunger in the first direction with a sufficient force to overcome the first opposing feedback force and allow the input device to move to the subsequent operating positions.

According to another aspect of the invention, a resilient biasing member can be disposed to oppose the movement of the plunger in the first direction along a predetermined portion of the path, the resilient biasing member generating at least a portion of the second opposing feedback force.

According to another preferred aspect of the invention, the at least one damper element can include a generally C-shape element for generating the first opposing feedback force which is resiliently compressible for yielding to the continued movement of the plunger in the first direction past the predetermined initial position for allowing the input device to move to the subsequent operating positions.

According to another aspect of the present invention, a feel bumper is disclosed having a housing including a first internal side wall portion defining a first cavity portion, a second internal side wall portion defining a second cavity portion, and an internal shoulder forming an opening connecting the first cavity portion and the second cavity portion. The feel bumper further includes a plunger disposed in the first cavity portion for movement toward the opening, and at least one damper element positioned in the first cavity portion between the plunger and the shoulder, the at least one damper element being displaceable or compressible so as to be forced into the opening due to contact with the shoulder and the plunger when moved toward the opening to a predetermined position so as to generate a first opposing feedback force in opposition to the movement.

BRIEF DESCRIPTION OF THE DRAWINGS

For a better understanding of the present invention, reference may be made to the accompanying drawings in which:

FIG. 2A is an enlarged simplified schematic representation of the feel bumper of FIG. 1 in a first operative mode;

FIG. 2B is a simplified schematic representation of the feel bumper of FIG. 1 in another operative mode;

FIG. 6A is a side view of one representative damper element for the feel bumper of FIG. 5;

FIG. 6B is a top view of the damper element of FIG. 6A;

FIG. 6C is a top view of the damper element of FIGS. 6A and 6B in a compressed state;

FIG. 7A is a side view of another damper element for use in the feel bumper of FIG. 5;

FIG. 7B is a top view of the damper element of FIG. 7A;

FIG. 7C is a top view of the damper element of FIGS. 7A and 7B in a compressed state;

FIG. 8A is a simplified schematic representation of another feel bumper according to the present invention;

FIG. 8B is a top view of a damper element of the feel bumper of FIG. 8A;

BEST MODE FOR CARRYING OUT THE INVENTION

Figure 1:
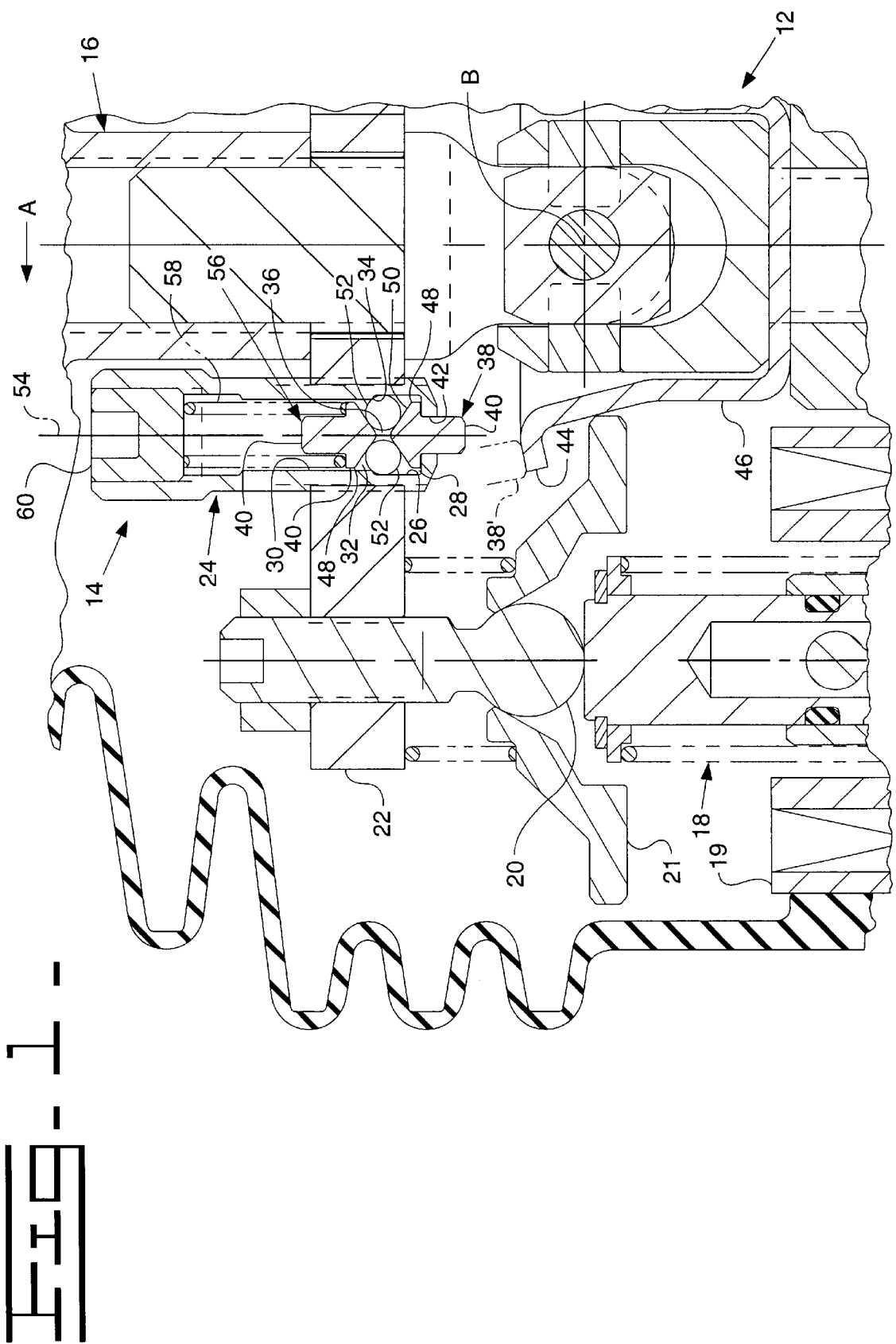
FIG. 1 is a simplified fragmentary schematic representation of an input device including a feel bumper according to the present invention.

Referring now to the drawings, in FIG. 1 an input device 12 is shown which is typically used for controlling a bucket or blade of a work machine such as, but not limited to, a crawler, grader, bulldozer, or the like (not shown). Input device 12 includes a feel bumper 14 constructed and operable according to the teachings of the present invention for providing a relatively high feedback force or load when a control lever 16 of input device 12 is pivotally moved, as denoted by the arrow A, about a pivotal axis B to an initial predetermined operating position. This position can be, for instance, a position for performing a certain operating function, such as, but not limited to, a commonly known quick drop, float, or float down function, such as in the instance of an input device for a work machine such as one of those identified above including a blade, bucket, or the like. Generally, input device 12 is operable for effecting or enabling selected operating functions, such as the quick drop, float, and float down functions, by actuating one or more pilot valves, represented by a pilot valve 18, by engaging a ball end 20 of an actuator plate 22 with the valve or valves in the well known conventional manner. Hold coil 19 can be magnetically configured to detent pull face 21 to retain lever 16 at a predetermined angle in known conventional manner.

Referring also to FIGS. 2A and 2B, feel bumper 14 includes a housing 24 including a first internal side wall portion 26 having a generally cylindrical shape and defining a first cavity portion 28. Housing 24 includes a second internal side wall portion 30 which also has a generally cylindrical shape and defines a second cavity portion 32, and an annular internal shoulder 34 forming an opening 36 connecting first cavity portion 28 and second cavity portion 32.

Feel bumper 14 includes a plunger 38 disposed in first cavity portion 28 for movement along a path of movement 54 in a first direction toward second cavity portion 32 and in the opposite direction. Plunger 38 includes a stem 40 which extends outwardly from first cavity portion 28 through an axial opening 42 of housing 24 in position for engaging (as illustrated in phantom and denoted by 38' in FIG. 1) a lip 44 of a cup 46 of input device 12 through which pivotal axis B of control lever 16 extends. Plunger 38 includes a head 48 opposite stem 40, head 48 including a tapered or conical surface 50 oriented at a predetermined angle, as will be explained.

Feel bumper 14 includes a plurality of damper elements 52, which in this embodiment comprise balls made of steel or other suitable hard material, disposed in first cavity portion 28 along path of movement 54 of plunger 38, path of movement 54 coinciding with the longitudinal axis of plunger 38 and cylindrical internal side walls 26 and 30. A second plunger 56 is disposed in second cavity portion 32 in spaced, opposed relation to plunger 38. Second plunger 56 includes a stem 40 and an opposite head 48 including a tapered or conical outer surface 50 oriented at a predetermined angle to path of movement 54, second plunger 56 also being movable along path of movement 54. A resilient biasing member 58 which in this embodiment is a compression coil spring, is disposed in second cavity portion 32 in engagement with second plunger 56, and an end cap 60 encloses a top end of second cavity portion 32, biasing member 58 being resiliently compressible between second plunger 56 and end cap 60.

In operation, control lever 16 of input device 12 can be pivoted through a range of positions about pivotal axis B for operating the valves thereof, represented by pilot valve 18, without plunger 38 coming into contact with or being urged against lip 44 of cup 46. When control lever 16 is in any of these positions such that plunger 38 is not biased or urged against lip 44, plunger 38 will extend substantially fully outwardly from axial opening 42, as shown in FIGS. 1 and 2A.

Then, when control lever 16 is pivoted about axis B to engage plunger 38 with lip 44 (shown in phantom and denoted by 38I in FIG. 1), plunger 38 will be either at a predetermined initial operating position or be movable by the engagement along a path of movement 54 in a first direction (denoted by arrow C in FIG. 2A) to the initial position, wherein surface 50 of plunger 38 will bear against damper elements 52 and damper elements 52 will bear against shoulder 34. With plunger 38 in this initial position, when control lever 16 is moved to move plunger 38 in the direction denoted by arrow C past this initial position, damper elements 52 will be urged against shoulder 34 to generate or produce a first opposing feedback force in opposition to such movement, which opposing feedback force will be felt by the operator holding control lever 16, to provide feedback to the operator of control lever 16 being moved to a particular operating position, such as, but not limited to, an operating position for actuating one or more pilot valves, such as pilot valve 18, for performing a certain operating function, such as a quick drop, float or float down function. This opposing force can be overcome by applying a force sufficient to roll, slide or otherwise move damper elements 52 over shoulder 34 so as to yield to the applied force and enter cavity portion 32 through opening 36, plus any additional force exerted at that time by resilient biasing member 58 in opposition to movement of damper elements 52 in the direction denoted by arrow C.

Once damper elements 52 have moved past shoulder 34, as illustrated in FIG. 2B, that component of the opposing force is diminished, such that only a second opposing feedback force generated by resilient biasing member 58 opposes further movement of plunger 38 in the direction denoted by arrow C. Preferably, the first opposing feedback force is from about 4 to about 10 times greater in magnitude than the second opposing feedback force, at least when plunger 38 is initially moved past the predetermined initial position, such as shown in FIG. 2B, so as to provide distinctive feedback to the operator. Here, it should be understood that the numerical range set forth above is not intended to limit the present invention. Instead, it is contemplated that any desired levels or degrees of force can be selected for the first and second opposing feedback forces as required for providing desired feedback. The force levels can be selected by varying one or more parameters of feel bumper 14, which parameters can include, but are not limited to, the number, size and shape of damper elements 52; the angles of tapered or conical surfaces 50 of first plunger 38 and second plunger 56; the extent of shoulder 34 relative to the location of first internal side wall portion 26; the angle of shoulder 34; the spring constant of resilient biasing member 58 or other measure of biasability thereof; and the coefficient or coefficients of friction between damper elements 52 and the surface or surfaces in which it is in contact.

Figure 3B:
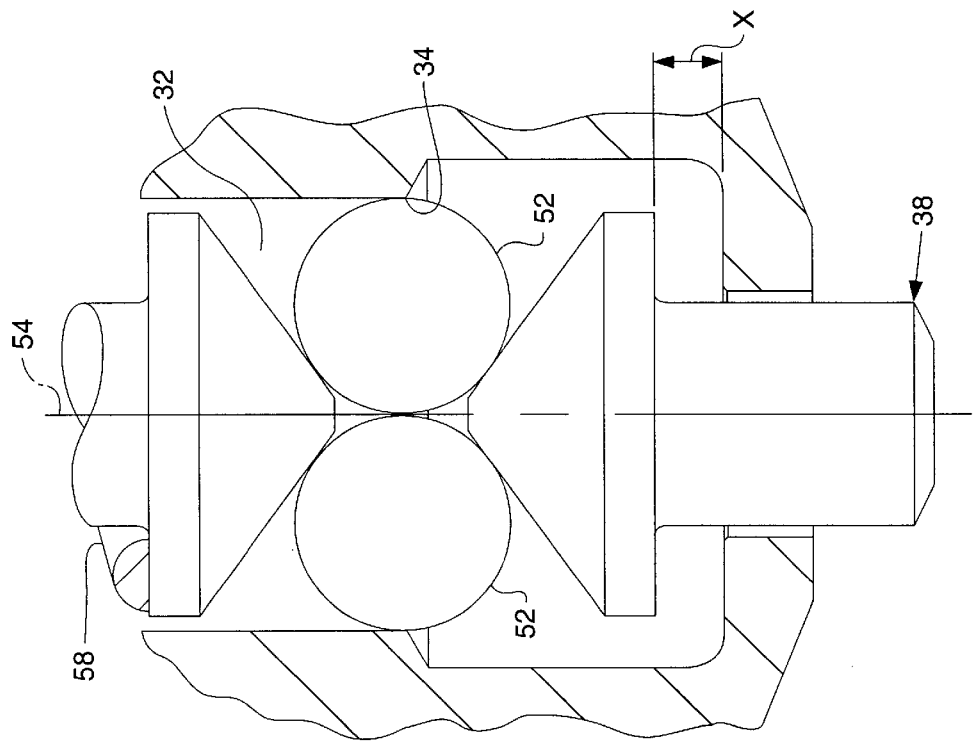
FIG. 3B is another fragmentary sectional representation of the feel bumper of FIG. 1.
Figure 3A:
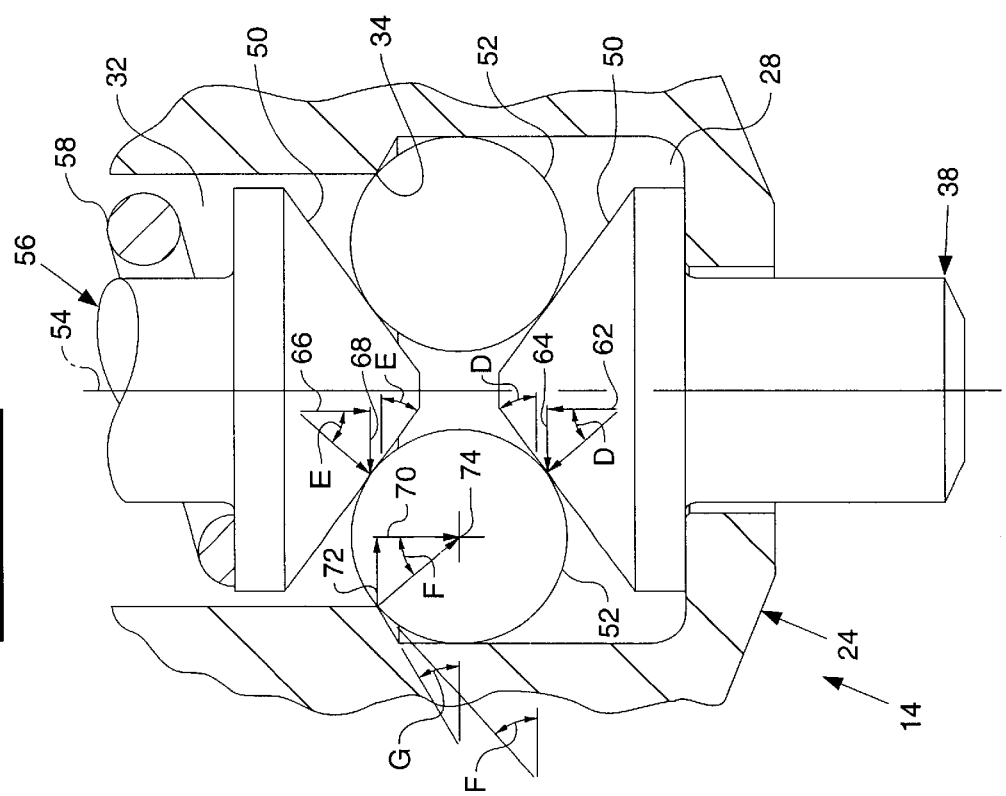
FIG. 3A is a fragmentary sectional representation of the feel bumper of FIG. 1.

Referring also to FIG. 3A, a fragmentary sectional view of feel bumper 14 is shown for illustrating the forces which generate the first opposing force. In FIG. 3A, plunger 38 is shown in the predetermined initial position wherein damper elements 52 are engaged with shoulder 34 of housing 24 and with second plunger 56 which is urged against damper elements 52 by resilient biasing member 58. In the initial position as shown, at equilibrium, the sum of the forces acting in or parallel to the direction of the path of movement 58 of plunger 38 represented by $\Sigma F_v$ will be zero, as will the sum of the forces acting perpendicularly to the path of movement 58 represented by $\Sigma F_H$, as shown by the following equations.

$$\Sigma F_v = 0$$

$$\Sigma F_H = 0$$

To achieve this equilibrium, the force applied by the operator in the direction denoted by arrow C against plunger 38 through control lever 16 as represented by $F_{in\ v}$ will equal the sum of the component of the force acting between shoulder 34 and damper elements 52 acting in the direction of path of movement 54 represented by $F_{ball\ v}$ and the component of the force exerted by resilient biasing member 58 against damper elements 52 as represented by $F_{spring\ v}$ as shown by the following equation.

$$F_{in\ v} = F_{ball\ v} + F_{spring\ v}$$

The component of the force acting between damper elements 52 and shoulder 34 in the direction perpendicular to direction of movement 58 as represented by $F_{ball\ h}$ will be equal to the sum of the perpendicular component of the applied force represented by $F_{in\ h}$ and the perpendicular component of the force exerted by resilient biasing member 58 represented by $F_{spring\ h}$ as follows.

$$F_{ball\ h} = F_{in\ h} + F_{spring\ h}$$

FIG. 3A shows vector diagrams of these forces, vector 62 representing the force component $F_{in\ v}$; the vector 64 representing the force component $F_{in\ h}$; the vector 66 representing the force component $F_{spring\ v}$; the vector 68 representing the force component $F_{spring\ h}$; the vector 70 representing the force component $F_{ball\ v}$; and the vector 72 representing the force component $F_{ball\ h}$. It follows that the tangent of the angle D formed by vectors 62 and 64; the tangent of the angle E formed by force vectors 66 and 68; and the tangent of the angle F formed by the force vectors 70 and 72, respectively, can be determined as follows.

$$\tan D = F_{spring\ h}/F_{spring\ v}$$

$$\tan E = F_{in\ h}/F_{in\ v}$$

$$\tan F = F_{ball\ h}/F_{ball\ v}$$

Further, angle D corresponds to the angle of surface 50 of plunger 38 with respect to a plane perpendicular to path of movement 54; angle E equals the angle of surface 50 of second plunger 56 with respect to a plane perpendicular to path 54; and angle F equals the angle of contact with shoulder 34 tangent to the contact surface of damper element 52 relative to a plane perpendicular to path 54. Angle G between the shoulder surface 34 relative to a plane perpendicular to path 54 may be the same or different to angle F.

The above equations can be used for determining the forces acting on the damper elements 52 in the direction parallel to the path of movement 54 with plunger 38 in the initial position as follows.

$$F_{ball\ v} = F_{in\ v} F_{spring\ v}$$

$$F_{ball\ v} \tan F = F_{in\ v\ (initial)} \tan D + F_{spring\ v} \tan E$$

Thus, given known values for angles D, E and F, and the force $F_{spring\ v}$ of resilient biasing member 58, when the plunger 38 is in the predetermined initial position as shown, the applied force can be calculated as follows.

$$F_{in\ v} = F_{spring\ v}((\tan D + 1)/(\tan F - \tan E))$$

To advance plunger 38 past the initial position along path of movement 54, damper elements 52 must be displaced transversely inwardly with respect to path of movement 54 sufficiently so as to roll, slide or otherwise move over shoulder 34 to thereby yield to the applied force and enter second cavity portion 32 through opening 36, and the force of resilient biasing member 58 as applied against damper elements 52 through second plunger 56 must be overcome. With the required applied force, this continued movement is possible with the selection of suitable values for angles D, E, and F, as well as suitable diameters for damper elements 52 and cavity portions 28 and 32 such that the centers of damper elements 52, represented by center 74, are located inwardly of shoulder 34 when damper elements 52 are positioned as shown.

Referring also to FIG. 3B, when a sufficient force $F_{in\ v}$ is applied against plunger 38 in the direction C (FIG. 2A) along path of movement 54, damper elements 52 will be urged by the applied force over shoulder 34 into second cavity portion 32, as shown. Then, the force exerted against the further movement of plunger 38 will be represented by the force $F_{spring}$ exerted by resilient biasing member 58 as follows.

$$F_{spring\ v} = F_{spring\ (initial)} + X(\text{spring rate}) + F_{friction}$$

where X is the displacement of plunger 38 along path 54 from the initial position (FIG. 3A) as shown in FIG. 3B and where Ffriction can be predetermined or minimized.

To give an example, if angles D and E each equal 35° and angle F equals 42°; $F_{spring\ v\ (initial)} = 19.6$ N; and the spring rate is 6.23 N/mm, for a displacement X of 1 mm, the second opposing force exerted in opposition to the movement of plunger 38 at its final position along path of movement 54 will be calculated as follows.

$$F_{spring\ v\ (final)} = 19.6 + (1 \times 6.23) = 25.8\ N$$

Also, the first opposing force $F_{in\ v}$ can be determined as follows.

$$F_{in\ v} = 19.6\ ((\tan 35 + 1)/(\tan 42 - \tan 35)) = 19.6(8.5) = 166\ N$$

which is slightly greater than 6 times the final second opposing force of 25.8 N.

Figure 4:
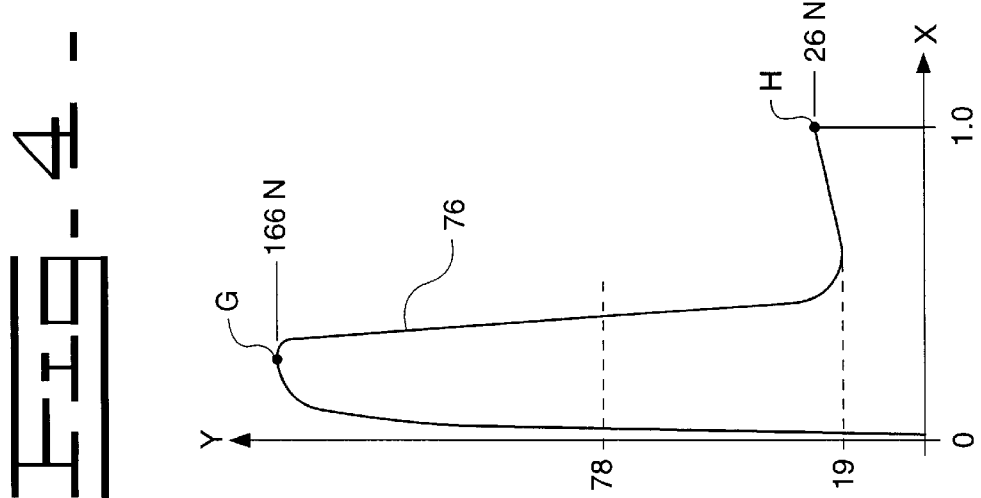
FIG. 4 is a graphical representation of force versus displacement for the feel bumper of FIG. 1.
Figure 9B:
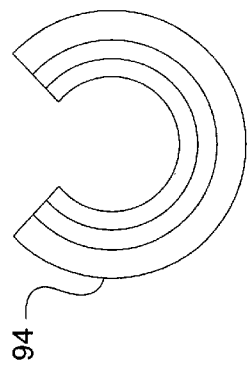
FIG. 9 is a simplified schematic view of another feel bumper according to the present invention.
Figure 9A:
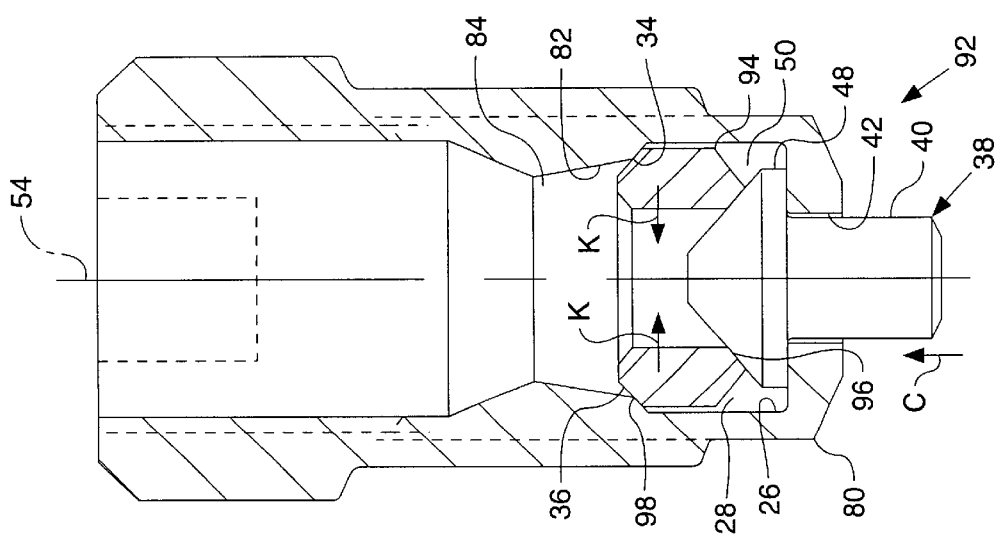

Referring to FIG. 4, a graphical representation including a curve 76 representing applied force versus displacement for the example just given shows the first opposing feedback force overcome when plunger 38 is at the predetermined initial position (point G) and the second opposing feedback force encountered when plunger 38 is displaced or moved 1 mm therefrom in the direction C (point H).

Figure 5:
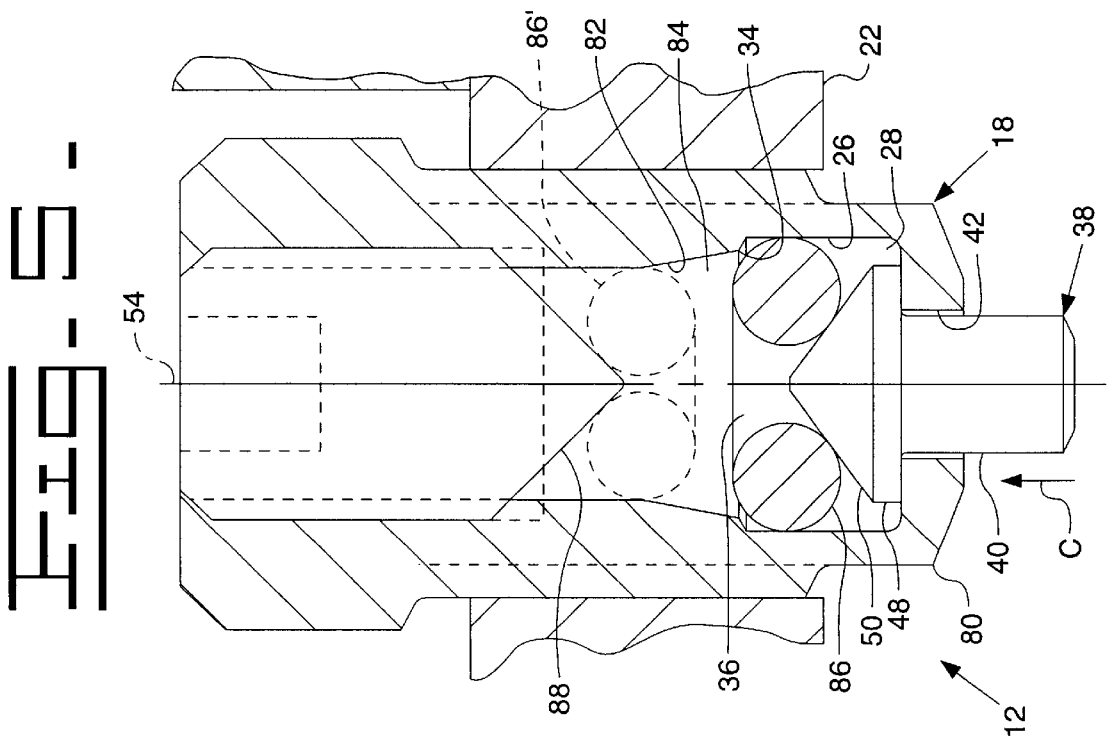
FIG. 5 is a simplified schematic representation of another feel bumper according to the present invention illustrating a damper element thereof in two operative positions.

Referring to FIG. 5, another feel bumper 78 constructed and operable according to the teachings of the present invention is shown mounted on actuator plate 22 of input device 12 in place of feel bumper 14 of FIG. 1, like parts of feel bumper 78 and feel bumper 14 being identified by like numbers. Feel bumper 78 includes a housing 80 including a first internal side wall portion 26 having a generally cylindrical shape and defining a first cavity portion 28. Housing 80 includes a second internal side wall portion 82 which has a tapered or frusto-conical shape defining a second cavity portion 84, and an annular internal shoulder 34 forming an opening 36 connecting first cavity portion 28 and second cavity portion 84.

Feel bumper 78 includes a plunger 38 disposed in first cavity portion 28 for movement in a first direction along a path of movement 54 toward second cavity portion 84, as denoted by arrow C. Plunger 38 includes a stem 40 which extends outwardly from first cavity portion 28 through an axial opening 42 of housing 80 in position for engaging a lip 44 of a cup 46 of input device 12, as illustrated in phantom in FIG. 1. Plunger 38 includes a head 48 opposite stem 40, head 48 including a tapered or conical surface 50 oriented at a predetermined angle relative to path of movement 54.

A damper element 86 is shown disposed in first cavity portion 28 in position to engage plunger 38 when in a predetermined initial position along path of movement 54, as also shown. Referring also to FIGS. 6A, 6B and 6C, damper element 86 is a generally C shape member which is resiliently compressible diametrically. Damper element 86 is shown in its free state or less compressed size in first cavity portion 28 of FIG. 5 and in FIGS. 6A and 6B, and is shown in phantom at 86' in FIG. 5 in a diametrically compressed state in second cavity portion 84. The compressed state is also illustrated in FIG. 6C. When plunger 38 is in the predetermined initial position as shown, movement of plunger 38 in the direction denoted by arrow C past shoulder 34 will be opposed by a first opposing feedback force which will consist of the force required to diametrically compress damper element 86 sufficiently to yield to the applied force and pass over shoulder 34 to enter second cavity portion 84 through opening 36, and any frictional forces between damper element 86 and the surfaces of plunger 38 and the surfaces of housing 80.

As with the previously discussed embodiment, it is preferable that the first opposing feedback force encountered as damper element 86 is overcoming shoulder 34 be distinctly greater than a subsequent second opposing feedback force encountered as damper element 86 is being urged through second cavity portion 84 by movement of plunger 38 in the direction denoted by arrow C so as to provide desired feedback to an operator moving control lever 16 to corresponding positions for performing certain operating functions such as quick drop, float or float down. The magnitude of the first opposing feedback force is a function of a number of factors, including, but not limited to, the size and angular orientation of shoulder 34; the angle of surface 50 of plunger 38; the free state diametrical size and sectional size of damper element 86; and the material and diametrical compressibility of damper element 86. With the sectional shape of damper element 86 shown, the first opposing force will be exerted as the half of damper element 86 closer to second cavity portion 84 passes over shoulder 34. Once about the midpoint of damper element 86 is in contact with second internal side wall portion 82, the second opposing force will begin to be exerted against plunger 38. This force is largely determined by the shape, size and composition of damper element 86; the coefficient of friction between the surfaces in contact; and the slope or angular orientation of second internal side wall portion 82. Also, due to the angular orientation of second internal side wall portion 82, the magnitude of the second opposing force will increase as damper element 86 increasingly moves into second cavity portion 84. A stop element 86 is mounted or otherwise disposed at a desired fixed location in second cavity portion 84 for stopping movement of damper element 86 when diametrically compressed to the size denoted by 86'.

Here, it should be observed that no resilient biasing member is present in second cavity portion 84. The need for such a member is eliminated by the ability of damper element 86 to store energy when diametrically compressed such as denoted as 86' in combination with the sloped or frusto-conical shape of side wall portion 82, because when the applied force exerted against plunger 38 to move it in the direction denoted by arrow C is removed or reduced, damper element 86 will be urged by the release of the stored energy to diametrically expand and this will cause it to move in the direction opposite that denoted by arrow C. When the applied force is sufficiently diminished, this will have the effect of pushing plunger 38 back to the predetermined initial position shown so as to effectively reset feel bumper 78.

As discussed above, factors determining the first and second opposing feedback forces include the size and shape of the damper element 86. Referring to FIGS. 7A and 7B, an alternative damper element 90 usable in feel bumper 78 is shown in its free state or lesser compressed diametrical size, and in a more compressed diametrical size as denoted at 90' in FIG. 7C. Damper element 90 is positionable and operable in feel bumper 78 in the same manner as damper element 86, but is of slightly smaller sectional size so as to be capable of producing a correspondingly lower opposing force compared to damper element 86. Here, it should be understood that it is contemplated that the damper elements according to the present invention can be of different sizes and/or shapes, and be made from different materials for providing different opposing forces and thus different levels of feedback, as desired for particular applications.

To illustrate one alternative construction possible, reference is made to FIGS. 8A and 8B, which show still another feel bumper 92 constructed and operable according to the teachings of the present invention, like parts of feel bumper 92 and feel bumpers 78 and 14 being identified by like numbers. Feel bumper 92 can be mounted on an actuator plate such as actuator plate 22 of input device 12 in place of feel bumper 14 (FIG. 1). Feel bumper 92 includes a housing 80 including a first internal side wall portion 26 having a generally cylindrical shape and defining a first cavity portion 28. Housing 80 includes a second internal side wall portion 82 which has a tapered or frusto-conical shape defining a second cavity portion 84, and an annular internal shoulder 34 forming an opening 36 connecting first cavity portion 28 and second cavity portion 84.

Feel bumper 92 includes a plunger 38 disposed in first cavity portion 28 for movement in a first direction toward second cavity portion 84, as denoted by arrow C. Plunger 38 includes a stem 40 which extends outwardly from first cavity portion 28 through an axial opening 42 of housing 80 in position for engaging a lip 44 of a cup 46 of input device 12, as illustrated in phantom in FIG. 1. Plunger 38 includes a head 48 opposite stem 40, head 48 including a tapered or conical surface 50 oriented at a predetermined angle relative to path of movement 54.

A damper element 94 is shown disposed in first cavity portion 28 in a predetermined initial position to engage plunger 38 when moved in a direction denoted by arrow C along path of movement 54. Damper element 94 is a generally C-shaped member having a first end surface 96 disposed for engaging surface 50 of plunger 38 in surface-to-surface contact, and an opposite end surface 98 disposed for engaging shoulder 34. Surface-to-surface contact offers reduce contact stress to reduce wear. When plunger 38 is in the predetermined initial position as shown, with end surface 96 of damper element 94 in contact with surface 50 of plunger 38 and end surface 98 in contact with shoulder 34, for plunger 38 to move past the initial position shown, a sufficient force must be applied against plunger 38 in the direction C to overcome a first opposing feedback force, that is, the applied force must be sufficient to cause damper element 94 to diametrically compress or yield, as denoted by arrows K, sufficiently for end surface 98 to move past shoulder 34 such that damper element 94 can enter second cavity portion 84. Once end surface 98 is past shoulder 34, a second opposing feedback force will be exerted by the contact between second internal side wall portion 82 and damper element 94 against further movement of damper element 94 and thus plunger 38 in the direction C. Because side wall portion 82 has a tapered or frusto-conical shape, damper element 94 will be progressively diametrically compressed as it advances in the direction C when in contact with side wall portion 82 which will result in a corresponding progressive increase in the second opposing force as damper element 94 advances through second cavity portion 84. As an additional element, feel bumper 92 can include a member for engaging damper element 94 and stopping the movement thereof in direction C at a desired location in second cavity portion 84, such as, but not limited to, a stop element 88 such as shown in FIG. 5 above. Damper element 94 is resiliently compressible so as to store energy when diametrically compressed, such that when the applied force urging plunger 38 in the direction C is lessened, damper element 94 will urge plunger 38 in the direction opposite the direction C and return plunger 38 to the predetermined initial position when the applied force is sufficiently relieved.

Figure 9:
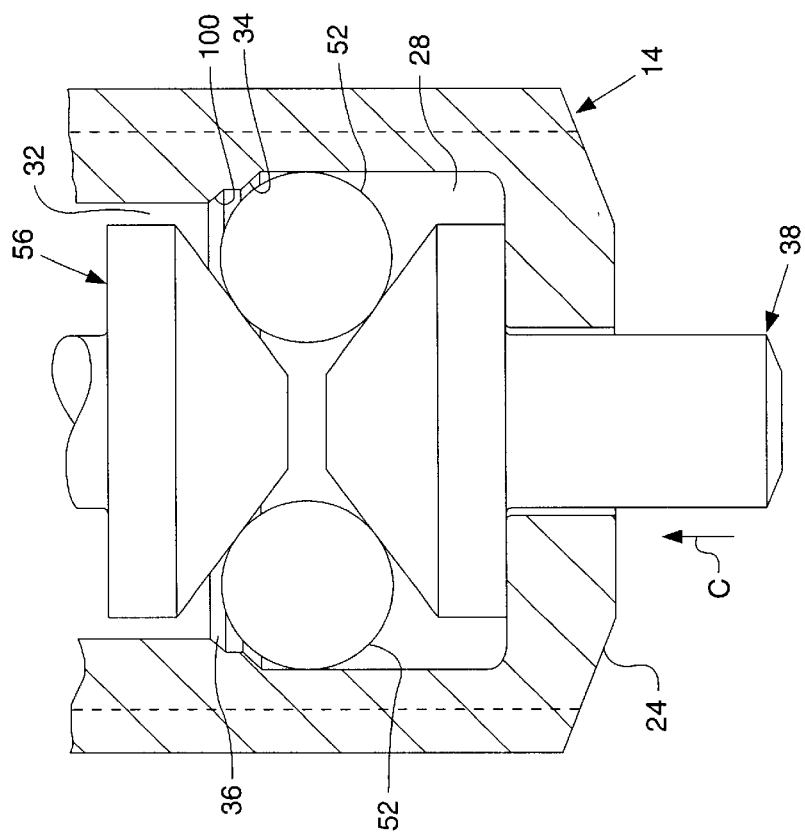

Turning to FIG. 9, to illustrate another variation of the present invention, feel bumper 14 is shown including a second shoulder 100 disposed around opening 36 between first cavity portion 28 and second cavity portion 32 of housing 24, in position to contact and engage damper elements 52 when past shoulder 34 and urged in the direction denoted by arrow C. To pass over second shoulder 100, like when passing over shoulder 34, damper elements 52 must be diametrically compressed, and will thus exert an opposing force which can be felt as feedback by the operator, as explained above. This opposing force will be subsequent to the first opposing force required to pass shoulder 34, and will have a magnitude which is a function of the same factors discussed above and which can be determined in the same manner. In this regard, it is contemplated that the opposing force generated as a result of shoulder 100 can be greater than, equal to, or less than the opposing force generated as a result of shoulder 34, as desired. Also, a resilient biasing member 58, which can be a compression spring or the like as shown above, can be utilized in cooperation with a second plunger 56 to provide an additional opposing force component in opposition to movement of plunger 38 into the direction C, as explained above, and to provide a subsequent opposing feedback force in opposition to the movement of plunger 38 in direction C once past the last of shoulders 34 and 100.

Here, it should be understood that it is contemplated that feel bumpers 14, 78 and 92 of the present invention can have any desired number of shoulders for generating or producing opposing first, second and subsequent opposing feedback forces of desired magnitudes at selected locations along the path of movement of plunger 38. As an illustration, for a work machine having a pilot valve actuated bucket or blade which can be operated in a commonly known quick drop mode by moving a control lever to an initial operating position and in a float mode by moving the control lever to a subsequent position, a feel bumper according to the present invention, including two shoulders, such as shoulders 34 and 100, could be utilized to provide desired high feedback forces when the control lever is moved to the quick drop and float positions. The magnitude of the respective feedback forces can be similar or one greater than the other, to provide a desired distinctive feel for each of the two operating positions.

When selecting a desired opposing force or forces, an additional factor to be considered is whether other forces will be acting with or against the control lever movement. Typically, it will be desired that the feedback levels signifying commencement of an operating mode such as a quick drop and/or a float be several orders of magnitude greater than the return or resetting force provided by a resilient biasing member 58, a centering spring, or the like. For instance, for some applications, a centering spring will be used to urge a control lever toward a center or other predetermined position and this should be taken into consideration when selecting the forces to be generated by the feel bumper.

Figure 10:
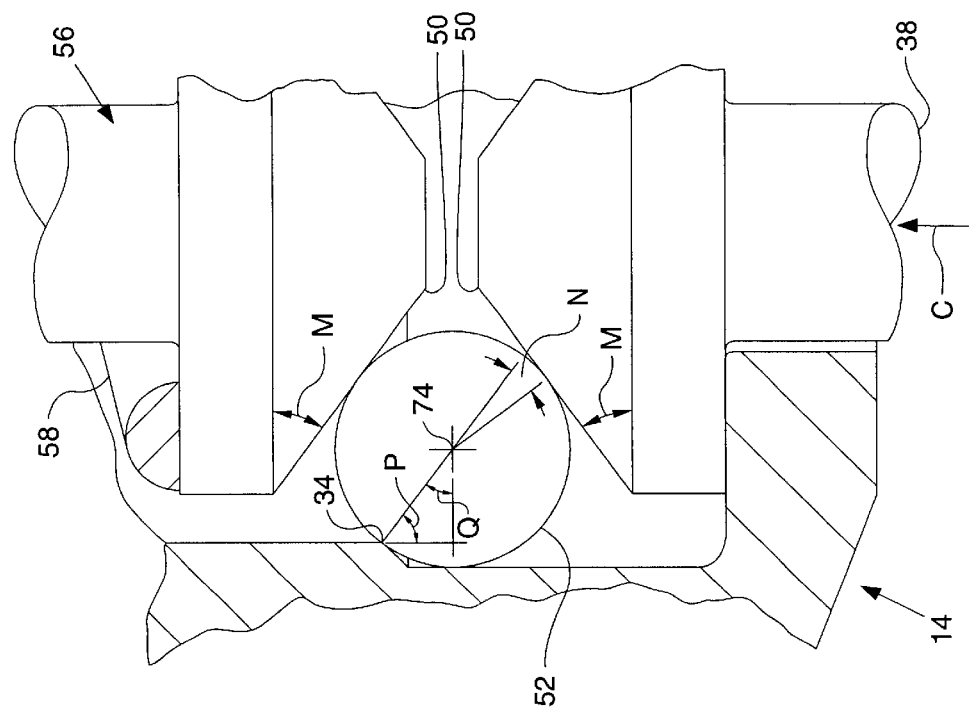
FIG. 10 is another fragmentary sectional representation of the feel bumper of FIG. 1.

Referring to FIG. 10, feel bumper 14 is again shown for illustrating a method for approximating a force multiplier, that is, the magnitude of the first opposing force relative to the force produced by resilient biasing member 58, acting in opposition to the movement of a damper element 52 past or over shoulder 34. An equation for approximating this force multiplier is as follows $$\text{Force Multiplier} \{1/\tan M/\tan N - C_f$$

wherein angle M is the angle of surface 50 of plungers 38 and 56 with respect to a plane perpendicular to the path of movement of plunger 38; angle N is a net difference between angles P and Q representing forces transmitted through center 74 of damper element 52 from contact with shoulder 34 and surface 50 of plunger 38; and $C_f$ is the coefficient of friction between damper element 52 and surfaces 50. As an example, for a plunger 38 having a surface 50 having an angle M of 35°; an angle P of 52°; an angle Q of 38°; a resultant net angle N of 17°; and a coefficient of friction of 0.075, a force multiplier of 6.2 to 1 would be calculated as follows.

$$\text{Force Multiplier} \left\{ \frac{1/\tan 35}{\tan 17 - 0.075} \right.$$
$$= 6.2 : 1$$

Thus, for a feel bumper 14 including a resilient biasing member 58 capable of exerting a force of 31 N in opposition to plunger 38, the first opposing feedback force will be this amount multiplied by 6.2 or 192 N. A preferred range for the force multiplier is from about 4 to 1 to about 10 to 1, such that angle M can range from about 25° to about 45°, and net angle N can range from about 13° to about 21° for a given value of angle M. Again, these are merely preferred ranges and are not intended to limit the present invention.

Figure 11A:
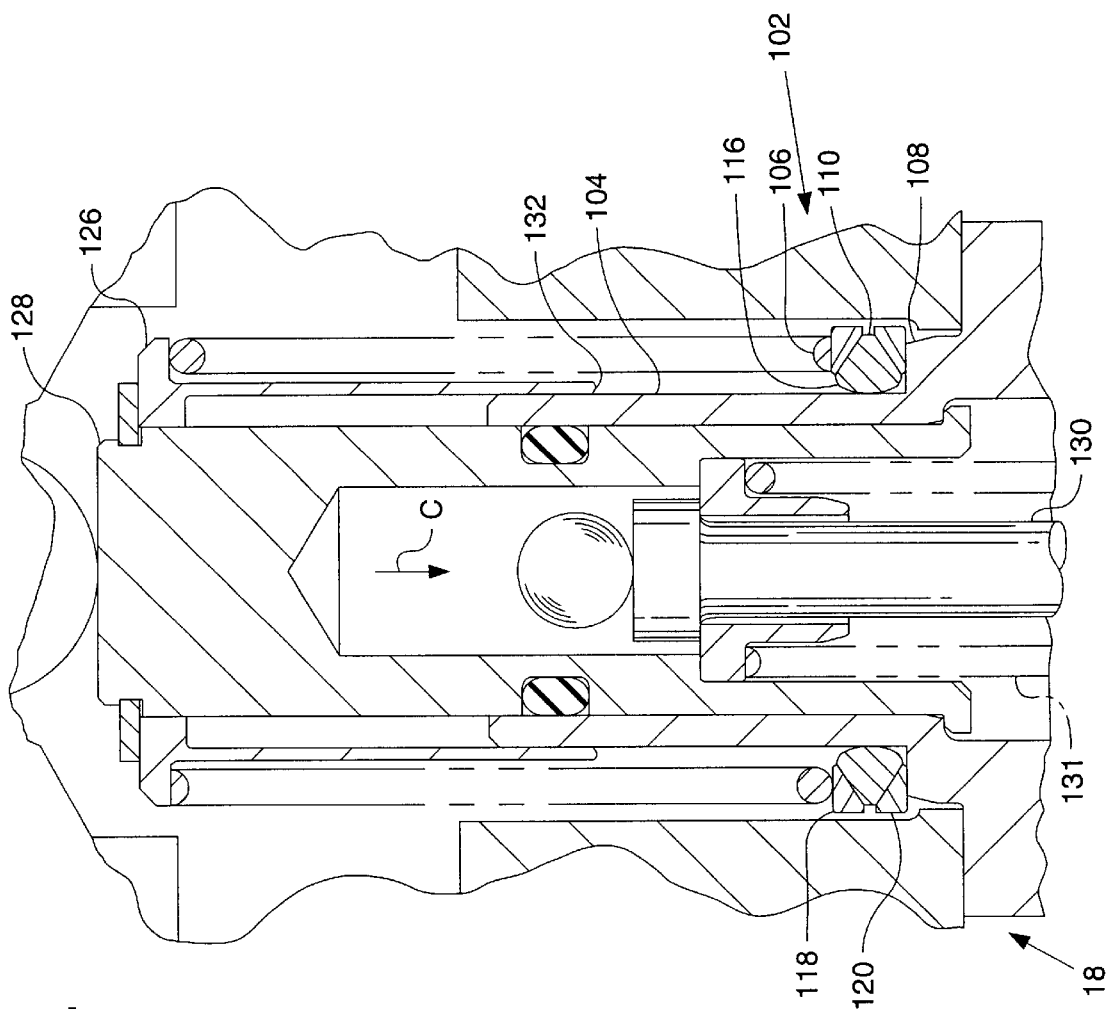
FIG. 11A is a simplified fragmentary schematic representation of a pilot valve including another feel bumper according to the present invention.
Figure 11C:
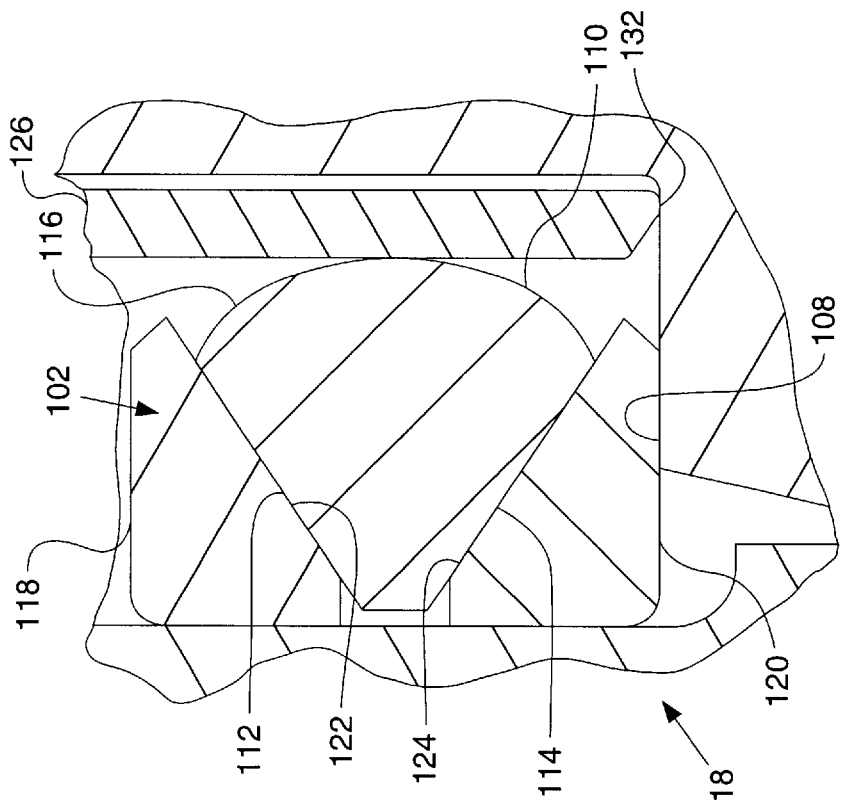
FIG. 11C is a fragmentary cross-sectional view of the feel bumper of FIG. 11A in a second operative mode.
Figure 11B:
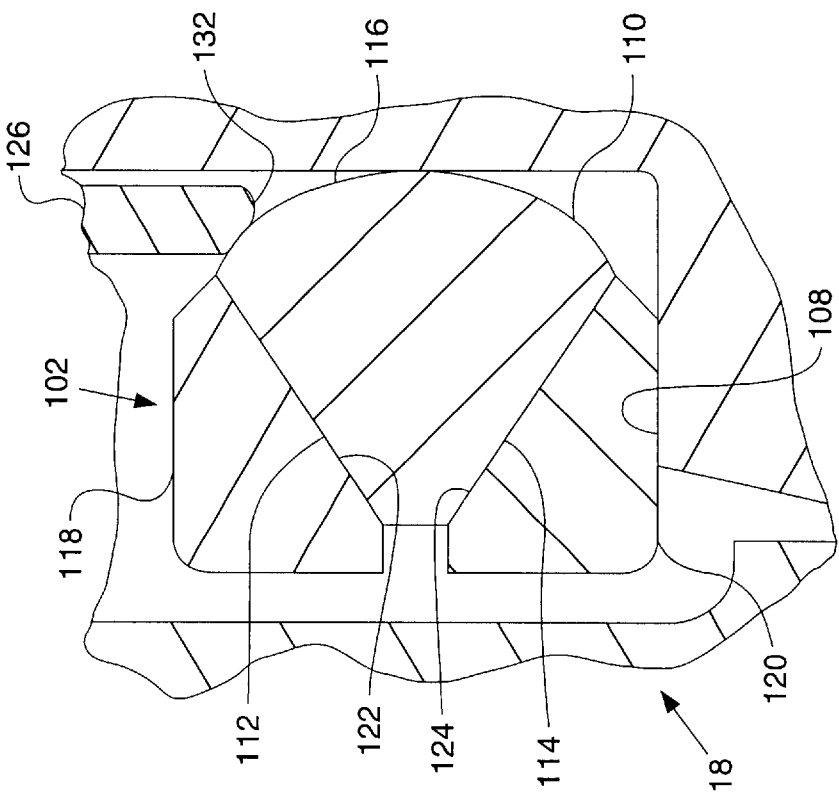
FIG. 11B is a fragmentary sectional view of the feel bumper of FIG. 11A in a first operative mode.

Referring to FIGS. 11A, 11B, and 11C, another feel bumper 102 constructed and operable according to the teachings of the present invention is shown in association with a conventionally constructed and operable pilot valve 18. Feel bumper 102 is an assembly of annular members disposed around a tubular body portion 104 of valve 18 between one end of a compression spring 106 and a shoulder 108 extending around valve 18 adjacent tubular body portion 104. Feel bumper 102 includes an annular wedge shape damper element 110 having angularly related surfaces 112, 114 and an inner surface 116 extending between surfaces 112 and 114 circumferentially inwardly thereof. Damper element 110 is disposed between an annular first retainer 118 and an annular second retainer 120, retainers 118, 120 including surfaces 122 and 124, respectively, in surface-to-surface engagement with surfaces 112 and 114 of element 110. Compression spring 106 includes a first end disposed to engage first retainer 118, and an opposite end disposed to be engaged by a tubular plunger 126 which telescopically receives tubular body portion 104. Body portion 104, in turn, telescopically receives a member 128 which is movable in a well known conventional manner by control lever 16 (FIG. 1) in a direction denoted by arrow C to effect movement of a valve stem 130 and valve spring 131, which movement is opposed by and operates to compress compression spring 106. Plunger 126 has a leading edge 132 positioned to engage surface 116 of element 110 when valve stem 130 is moved sufficiently for initiating a desired operating function, such as, but not limited to, a quick drop or float function. When in this position, edge 132 of plunger 126 abuts or contacts an upper portion of inner surface 116 of element 110 such that for edge 132 to move farther in direction C sufficient force must be applied via control lever 16 (FIG. 1) to force wedge member 110 to diametrically expand against first and second retainers 118, 120, such that surface 112 slidably engages surface 122 and surface 114 slidably engages surface 124, which drives first retainer 118 against compression spring 106, thereby providing a substantial feedback force. With application of a sufficient input force via control lever 16, element 110 will yield to edge 132 such that valve stem 130 can be positioned at a desired location for performing subsequent operating functions. Then, when the applied input force is lessened or relieved, compression spring 106 will expand, so as to move edge 132 in the direction opposite direction C to a reset or original position. Since the spring 106 is part of the pilot valve 18, the overall loads felt by the operator of lever 16 can be reduced by using the spring 106 as the biasing member for the feel bumper.

INDUSTRIAL APPLICABILITY

The feel bumpers according to the present invention described above have utility for a wide variety of applications wherein a high initial force or load is desired to provide feedback to an operator of positioning and input device for performing a certain operating function, and lower feedback forces when the input device is positioning for performing related or other functions. The feel bumpers according to the present invention provide a more compact, simpler and more durable alternative to known feel bumper constructions currently used.

Other aspects, objects and advantages of the present invention can be obtained from a study of the drawings, the disclosure and the appended claims.

What is claimed is:

1. A feel bumper, comprising:
   a plunger disposed for movement along a predetermined path; and
   at least one damper element disposed to engage the plunger when in a predetermined initial position along the path for exerting a first opposing feedback force against the plunger in opposition to movement thereof along the path in a first direction, the at least one damper element being yieldable to the plunger when moved in the first direction past the predetermined initial position and exerting a second opposing feedback force against the plunger in opposition to the continued movement of the plunger in the first direction, the second opposing feedback force being less than the first opposing feedback force.

2. The feel bumper of claim 1, further comprising a resilient biasing member disposed to oppose the movement of the plunger in the first direction along a predetermined portion of the path.

3. The feel bumper of claim 2, wherein the first opposing feedback force is generated at least substantially by the at least one damper element, and the second opposing feedback force is generated at least substantially by the resilient biasing member.

4. The feel bumper of claim 1, wherein the at least one damper element comprises at least one ball disposed to be urged by the plunger against a shoulder located along the path of movement when the plunger is at the predetermined initial position for generating the first opposing feedback force, the at least one ball being displaceable past the shoulder by movement thereof in the first direction by the plunger to thereby yield to said movement.

5. The feel bumper of claim 1, wherein the at least one damper element comprises a generally C-shape element compressible diametrically for yielding to said movement of the plunger in the first direction past the predetermined initial position.

6. The feel bumper of claim 2, wherein the resilient biasing member comprises a compression spring.

7. The feel bumper of claim 1, further comprising a second plunger disposed for engaging the at least one damper element when moved in the first direction past the predetermined initial position for exerting the second opposing feedback force thereagainst.

8. The feel bumper of claim 1, wherein the plunger comprises a tubular member which telescopically receives a body when moved in the first direction along the path, and the at least one damper element comprises a generally annular member extending at least substantially around the body at a location for engaging the plunger and exerting the opposing feedback forces thereagainst when moved in the first direction along the body.

9. The feel bumper of claim 8, wherein the annular member has a surface portion positioned to engage the plunger when moved in the first direction to the predetermined initial position for exerting the first opposing feedback force thereagainst, the annular member further including an adjacent surface portion for slidably engaging the plunger for exerting the second opposing feedback force thereagainst as the plunger is moved in the first direction past the predetermined initial position.

10. The feel bumper of claim 9, wherein a resiliently yieldable member is positioned for urging the annular member against the plunger when moved past the predetermined initial position for exerting the second opposing feedback force thereagainst.

11. The feel bumper of claim 8, wherein the body comprises a body portion of a valve.

12. The feel bumper of claim 1, wherein the at least one damper element is disposed to exert a third opposing feedback force against the plunger when moved in the first direction to a second predetermined position along the path and yield to continued movement of the plunger in the first direction past the second predetermined position.

13. A feel bumper, comprising:

a housing including a first internal side wall portion defining a first cavity portion, a second internal side wall portion defining a second cavity portion, and an internal shoulder forming an opening connecting the first cavity portion and the second cavity portion;

a plunger disposed in the first cavity portion for movement toward the opening; and at least one damper element positioned in the first cavity portion between the plunger and the shoulder, the at least one damper element being displaceable or compressible so as to be forced into the opening due to contact with the shoulder and the plunger when moved toward the opening to a predetermined position so as to generate a first predetermined feedback force in opposition to the movement.

14. The feel bumper of claim 13, further comprising a biasing member disposed to yieldably oppose movement of the plunger in the second cavity portion to provide a second predetermined feedback force in opposition to the movement of the plunger, the second predetermined feedback force being less than the first predetermined feedback force.

15. The feel bumper of claim 13, wherein the at least one damper element comprises at least one ball disposed to be urged by the plunger against the shoulder when the plunger is at the predetermined position for generating the first predetermined feedback force.

16. The feel bumper of claim 13, wherein the at least one damper element comprises a generally C-shape element resiliently compressible diametrically for generating the first predetermined feedback force.

17. The feel bumper of claim 13, further comprising a second plunger disposed in the opening in a position to yieldably oppose movement of the at least one damper element into the opening and through the second cavity portion.

18. The feel bumper of claim 17, further comprising a resilient biasing element disposed in the second cavity portion for urging the second plunger toward the first plunger.

19. The feel bumper of claim 18, wherein the plungers have tapered surfaces disposed for contact with the at least one damper element.

20. The feel bumper of claim 13 wherein the second internal side wall portion has a tapered portion extending convergingly in a direction extending away from the shoulder, and the at least one damper element being movable by the plunger into the second cavity portion and into contact with the tapered portion so as to be progressively compressed by movement farther into the second cavity portion for generating a correspondingly increasing force in opposition to said movement.

21. The feel bumper of claim 20 wherein the at last one damper element will store energy when compressed and is cooperable with the tapered portion to release the energy by moving toward the first cavity portion and expanding when the plunger is withdrawn therefrom.

22. The feel bumper of claim 13 further comprising a second shoulder extending at least partially around the opening the at least one damper element being displaceable or compressible when moved against the second shoulder so as to generate a second predetermined feedback force in opposition to the movement.

* * * * *